S. G. MURRAY.
COMPENSATOR FOR WEIGHING MACHINES.
APPLICATION FILED OCT. 16, 1909.
963,623.
Patented July 5, 1910.
2 SHEETS—SHEET 1.
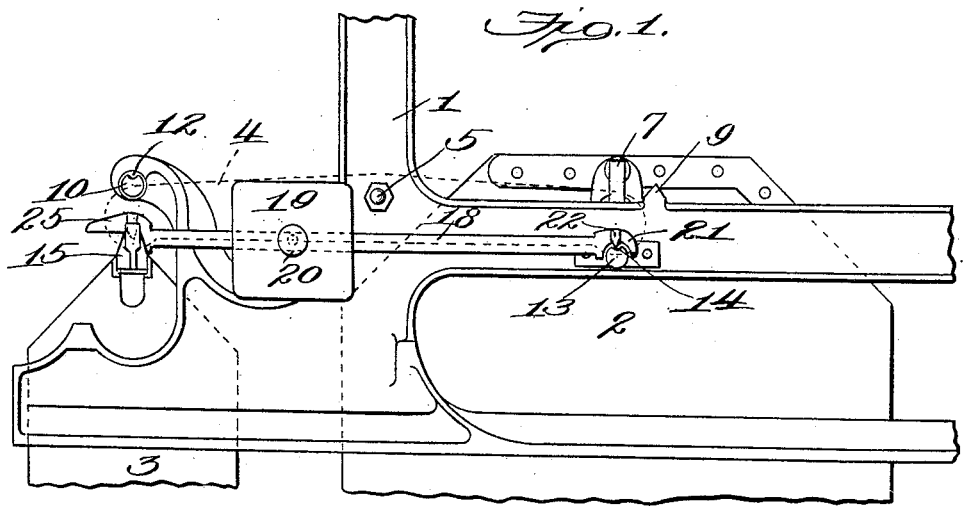
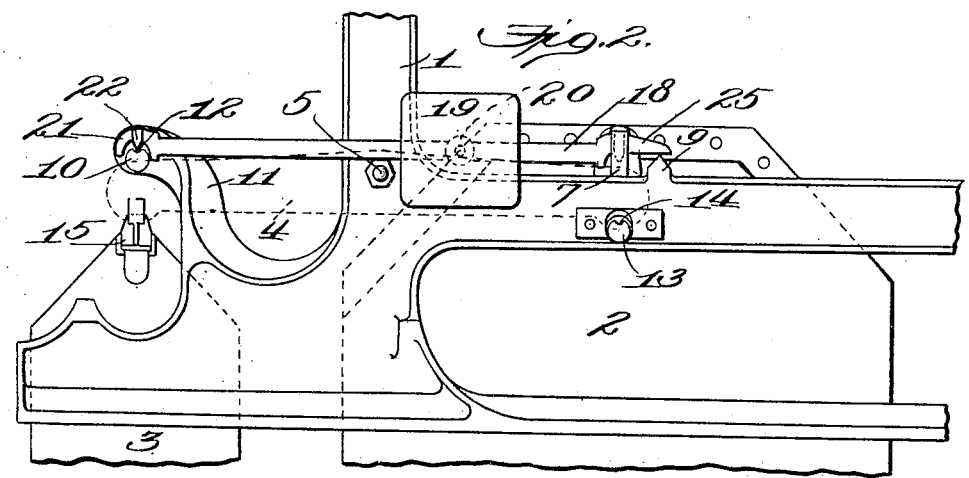
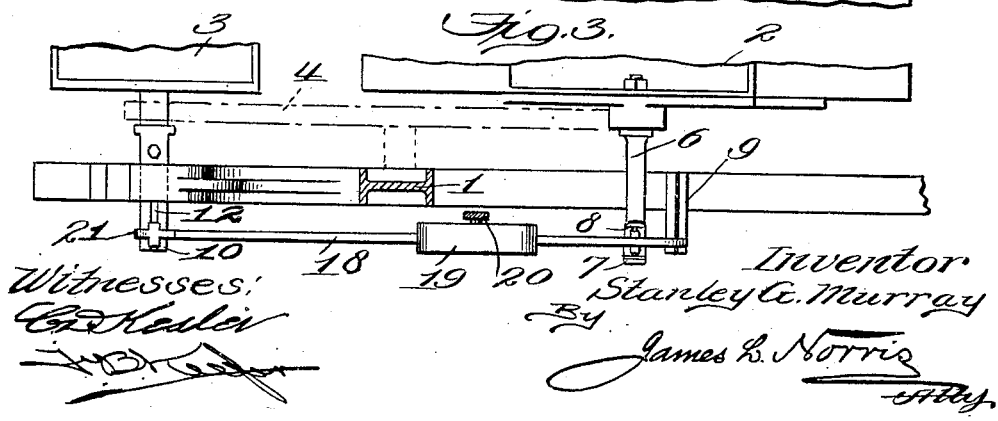
Witnesses:
Inventor
Stanley G. Murray
By James L. Norris
Atty.

S. G. MURRAY.
COMPENSATOR FOR WEIGHING MACHINES.
APPLICATION FILED OCT. 16, 1909.
963,623.
Patented July 5, 1910.
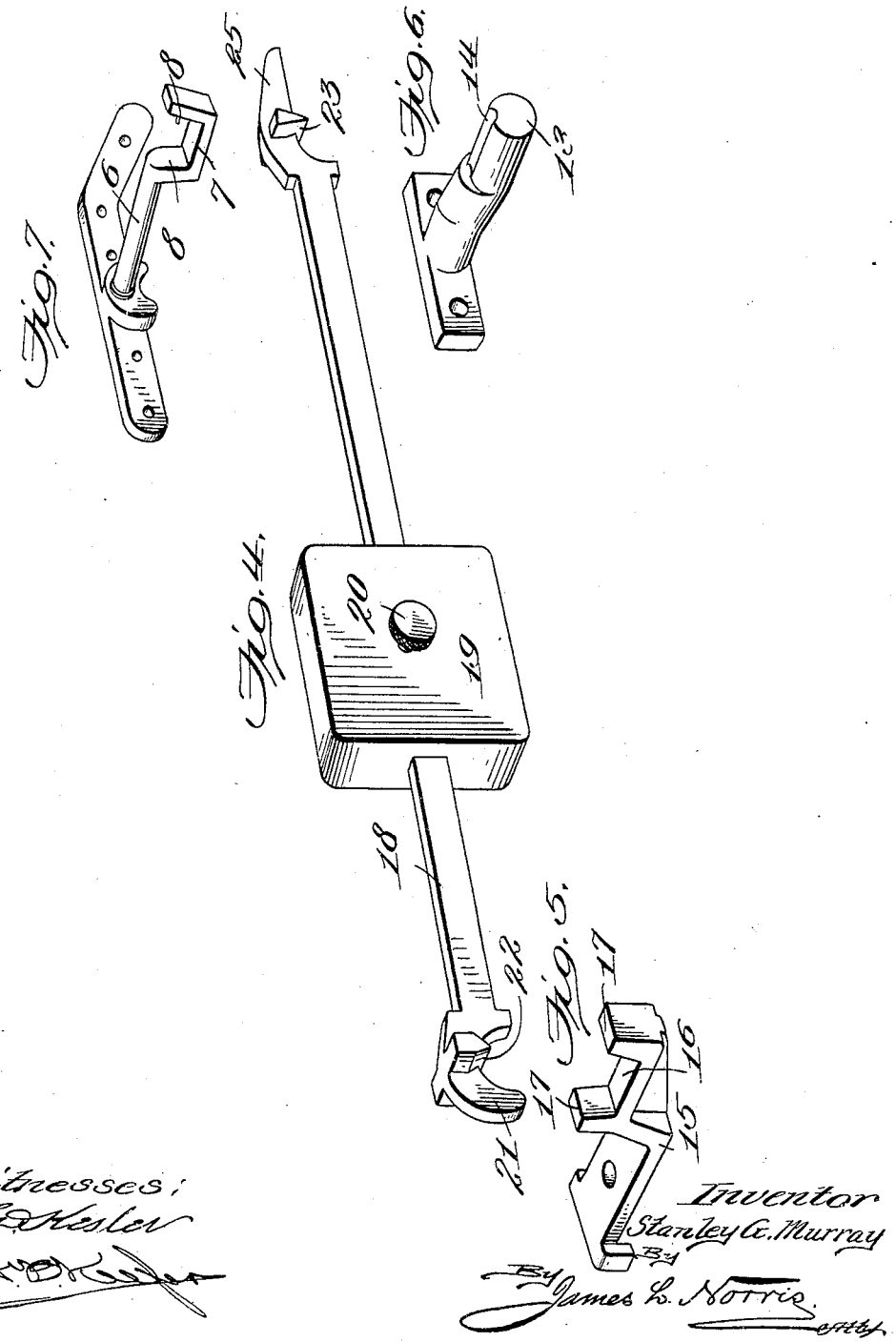

UNITED STATES PATENT OFFICE.

STANLEY G. MURRAY, OF PASSAIC, NEW JERSEY, ASSIGNOR TO RICHARDSON SCALE COMPANY, OF NEW YORK, N. Y., A CORPORATION OF NEW JERSEY.

COMPENSATOR FOR WEIGHING-MACHINES.

963,623.

Specification of Letters Patent.

Patented July 5, 1910.

Application filed October 16, 1909. Serial No. 522,988.

*To all whom it may concern:*

Be it known that I, STANLEY G. MURRAY, a subject of the King of Great Britain, residing at Passaic, in the county of Passaic, State of New Jersey, United States of America, have invented certain new and useful Improvements in Compensators for Weighing-Machines, of which the following is a specification.

My present invention relates to improvements in weighing machines of the well known type embodying a weighing hopper into which the material falls through a gate or valve, which gate or valve is closed automatically upon the settling or descent of the hopper, and it has for its object to provide simple and accurate means whereby the drag or overcharge due to the falling of the column of material into the hopper after the closing of the gate is compensated for, the compensating means being capable of easy manipulation, and when once set, is capable of maintaining a given adjustment and of insuring an accurate weighing of the material at each weighing operation.

More specifically, the invention provides a compensator which is capable of being reversibly applied with respect to the weigh hopper and the counterbalance or weight box whereby after the usual weighing has been made, the weigh hopper and its counterbalance may be brought into equilibrium through the medium of the compensator and the latter is then reversed whereby the drag or overcharge of the material in the weigh hopper is subtracted therefrom, the subsequent weighing operations uniformly producing accurate charges of the material.

To these and other ends the invention consists in certain improvements, and combinations and arrangements of parts, all as will be hereinafter more fully described, the novel features being pointed out particularly in the claims at the end of the specification.

In the accompanying drawings: Figure 1 is a side elevation of a portion of a weighing machine showing the compensator mounted thereon in a manner to determine the amount of drag or overcharge material due to the falling of a column of material into the weigh hopper after the closing of the gate or valve. Fig. 2 is a view similar to Fig. 1, showing the compensator mounted in reversed position whereby the amount of overcharge in the weigh hopper may be compensated for. Fig. 3 represents a plan view of the parts shown in Fig. 2, indicating the relative position of the compensator. Fig. 4 is a perspective view of the compensator lever or bar. Figs. 5 and 6 are perspective views of the bearing brackets which are adapted to be applied to the weight box and the frame respectively, and Fig. 7 is a perspective view of the bearing arm which is adapted to be attached to the weigh hopper.

Similar parts are designated by the same reference characters in the several views.

Compensators constructed in accordance with the present invention are applicable generally to the well known type of automatic weighing machines wherein the fall of material to the weigh hopper is cut off or controlled automatically by the descent of the weigh hopper, an example of such a machine being disclosed for instance in Letters Patent granted to Henry Richardson, No. 844,188, dated February 12, 1907, and its purpose is to correct the overcharge due to the falling of the suspended column of material into the hopper after the closing of the cut-off gate or valve. In the drawings, I have shown the compensator as applied to a weighing machine of the Richardson type, although it will be understood that the device is capable of application to weighing machines of other types, and it will also be understood that the invention is not limited to the specific embodiment shown as certain modifications and changes may be made in the detail construction and arrangement of parts whereby the invention may be applied to the best advantage according to the circumstances or requirements of each particular case.

In the present instance, 1 designates a portion of the machine frame, 2 designates the weigh hopper and 3 the counterbalance which is usually in the form of a weight box, the weigh hopper and weight box being connected by a weigh beam 4 which is tiltably supported upon the frame at each side by a bearing 5. The cut-off gate or valve is mounted above the weigh hopper and may be operatively connected to the latter by any suitable mechanism such, for example, as that disclosed in the prior patent above referred to, the gate or valve being closed automatically when the weigh hopper descends or settles after receiving a predetermined amount of material. Projecting laterally from the weigh hopper is a bearing arm 6 which has a bearing 7 which is preferably arranged in a plane exteriorly of the machine frame, this bearing having shoulders 8 to coöperate with and maintain the compensator in proper position. The frame is provided at a point adjacent to the bearing arm 6 of the weigh hopper, with an upwardly extending projection 9, the upper side of which is preferably tapered or sloped, as shown, and serves as a limiting stop for the compensator. The frame of the machine is also provided at a point above the counterbalance or weight box, with a laterally projecting bearing arm 10 which, in the present instance, is supported by an arm 11 on the frame and this bearing arm is preferably of substantially cylindrical form, its upper portion, however, being formed with an axially extending groove 12 to form a seat for a knife edge bearing carried by the compensator. The frame is also provided with a bearing 13 which may be bolted or otherwise suitably secured to the frame and this bearing is preferably of substantially cylindrical form, its upper surface being provided with a longitudinally extending groove 14 which is arranged immediately below the bearing 6 on the weigh hopper and forms a seat for a knife edge on the compensator. The weight box or counterbalance 3 is also equipped with a bearing bracket 15 which projects laterally therefrom immediately beneath the bearing bracket 10 on the frame and the bracket 15 has a seat 16 which is preferably flat and has lugs or projections 17 extending upwardly therefrom at its inner and outer ends.

The compensator embodies a bar or lever 18 which is preferably rectangular in cross section and carries a compensating weight 19 which is slidable longitudinally thereon, this weight being provided with suitable means for locking or retaining it at an appropriate position with respect to the length of the bar or lever, a set screw 20 being tapped into one side of the weight in the present instance, and its inner end is arranged to coöperate with one side of the bar. The compensating bar or lever is provided at its opposite ends with bearings which are capable of being reversibly applied to the bearings 6 and 10, and 13 and 15, respectively. In the present instance one end of the bar is provided with a segmental or substantially semi-circular head 21, the opening in which faces downwardly, and a transversely arranged knife edge 22 is formed at the top of the head, said edge projecting a suitable distance inwardly from the circumference of the opening, this knife edge projecting laterally from opposite sides of the head so as to steady the bar and prevent tilting as well as to form an efficient bearing upon the seats 12 and 14. The opposite end of the bar or lever is provided with a transversely extending knife edge 23 which preferably projects beyond the opposite sides of the bar and this knife edge is adapted to bear upon either the bearing seat 7 or the bearing seat 16. The knife edge 23 is adapted to be located between the shoulders 8 of the bearing arm 6, or the shoulders or lugs 17 of the bearing 15, so as to center the bar with respect thereto. An arm 25 projects outwardly from this end of the bar or lever a suitable distance beyond the knife edge 23 to engage the stop 9 when the weigh hopper settles to the proper extent.

To obtain a correct weighing with the aid of the compensator constructed in accordance with the present invention, a charge of material is dumped into the hopper in the usual way and while the compensator is removed from the machine. In operating machines of the automatic class it has been found that an overcharge of material is deposited in the weigh hopper owing to the falling of a column of the material into the hopper after the cut-off gate or valve has been closed, due to the settling of the hopper. To compensate for such an overcharge in subsequent weighing operations, the compensator is first applied to the machine in the manner shown in Fig. 1, the knife edge bearing 22 resting in the seat 14 of the bearing bracket 13 fixed to the machine frame, while the knife edge 23 rests upon the seat 16 of the bearing bracket 15. The compensating weight 19 is then moved rearwardly from a median line between the weigh hopper and the counterbalance until it is found that the counterbalance, with the added effect of the compensating weight 19, will poise the weigh hopper containing the overcharge of material. The compensator is then reversibly applied with respect to the weigh hopper and counterbalance, as shown in Fig. 2, the knife edge 22 of the compensating bar resting in the bearing seat 12 of the bearing bracket 10 fixed to the rear end of the machine frame, while the knife edge 23 rests upon the bearing seat 7 of the bearing arm 6 which is fixed to the weigh hopper. By so reversing the compensator, the compensating weight will subtract from the counterbalance a weight equal precisely to the weight of the overcharge contained in the weigh hopper. After the charge contained in the weigh hopper has been discharged it will be found that the subsequent operation of the machine will accurately weigh and discharge the proper charges of material, the stop arresting the descending movement of the compensating lever and permitting the scale to balance or reach an equipoise. It will be understood of course that the distance between the centers of the bearings 7 and 12 is precisely equal to the distance between the bearings 14 and 16. The locking device for the compensating weight is preferably so located that when the compensator is in working position, as shown in Fig. 1, this locking device will be arranged at the inner side of the compensating weight or toward the weighing machine. Liability of changing the adjustment through accident or otherwise will be prevented while grain of one kind is being handled, it being understood that in operating upon a different kind of grain, the compensator will be reversed while the amount of overcharge is being determined, at which time this locking device will be arranged at the outer side of the compensating weight and will therefore be exposed for convenient adjustment. It is to be observed that the use of a calibrated scale and computations is unnecessary so that the adjustment may be made with the greatest facility and there is no opportunity of error.

I claim as my invention:

1. In a weighing machine, the combination of a frame, a weigh hopper and counterbalance, and a compensator capable of being reversibly mounted with respect to the frame and the weigh hopper and counterbalance.

2. In a weighing machine, the combination of a frame, a weigh hopper and counterbalance, and a compensator comprising a bar and a compensating weight adjustable longitudinally thereof, said bar being adapted to be reversibly applied with respect to the frame and weigh hopper and counterbalance.

3. In a weighing machine, the combination of a frame, a weigh hopper and counterbalance, a bearing movable with the weigh hopper, a bearing movable with the counterbalance, bearings fixed to the frame, the distance between the bearing on the weigh hopper and one of the bearings on the frame being equal to the distance between the bearing on the weigh hopper and the remaining bearing on the frame, and a compensator capable of being reversibly applied with respect to the bearing on the weigh hopper and its corresponding bearing on the frame and the bearing on the counterbalance and its corresponding bearing on the frame.

4. In an automatic weighing machine, the combination of a frame, a weigh hopper and counterbalance, and two pairs of bearings, one pair being on the weigh hopper and frame and the other pair on the counterbalance and frame, and a compensator comprising a bar having a compensating weight adjustable thereon, said bar having at opposite ends bearings capable of being reversibly applied with respect to either of said pairs of bearings.

5. In a weighing machine, the combination of a frame, a weigh hopper and counterpoise, pairs of bearings arranged on the weigh hopper and frame and on the counterpoise and frame, and a compensator comprising a bar having laterally extending knife edges upon its ends capable of being applied reversibly with respect to either of said pairs of bearings.

6. In a weighing machine, the combination of a frame, a weigh hopper and counterpoise, two pairs of bearings arranged on the weigh hopper and frame and on the counterpoise and frame respectively, a compensator comprising a bar capable of being reversibly applied to either of said pairs of bearings, and a stop on the frame arranged to coöperate with one end of said compensator to arrest its movement and permit a balance of the weigh hopper and counterpoise.

In testimony whereof I have hereunto set my hand in presence of two subscribing witnesses.

STANLEY G. MURRAY.

Witnesses:
JOHN TAYLOR,
J. H. HAYNES.